United States Patent
Tsai et al.

(10) Patent No.: US 8,432,332 B2
(45) Date of Patent: Apr. 30, 2013

(54) EXTENSIBLE USER INTERFACE FOR DIGITAL DISPLAY DEVICES

(75) Inventors: Leonard Tsai, Mountain View, CA (US); Binh Truong, Sunnyvale, CA (US); Kyoung Il Kim, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 12/997,874

(22) PCT Filed: Jun. 18, 2008

(86) PCT No.: PCT/US2008/067277
§ 371 (c)(1),
(2), (4) Date: Dec. 13, 2010

(87) PCT Pub. No.: WO2009/154619
PCT Pub. Date: Dec. 23, 2009

(65) Prior Publication Data
US 2011/0102316 A1 May 5, 2011

(51) Int. Cl.
*G09G 5/00* (2006.01)
*G06F 3/00* (2006.01)

(52) U.S. Cl.
USPC ............................... 345/2.3; 715/747

(58) Field of Classification Search ............ 345/2.3, 345/156; 715/714, 716, 747
See application file for complete search history.

(56) References Cited

U.S. PATENT DOCUMENTS

| | | | |
|---|---|---|---|
| 7,296,284 B1 | 11/2007 | Price | |
| 7,577,910 B1 * | 8/2009 | Husemann et al. | 715/747 |
| 7,970,436 B1 * | 6/2011 | Katzer et al. | 345/2.3 |
| 2005/0176461 A1 | 8/2005 | Bozzone | |
| 2007/0130523 A1 | 6/2007 | Ku | |
| 2007/0139373 A1 | 6/2007 | Simon | |
| 2010/0082784 A1 * | 4/2010 | Rosenblatt et al. | 709/222 |

OTHER PUBLICATIONS

WIPO, PCT/US2008/067277, International Search Report, Feb. 26, 2009.

* cited by examiner

*Primary Examiner* — Kevin M Nguyen

(57) ABSTRACT

In one embodiment, a system to manage video content comprises an index file management module comprising logic to generate an index file to describe content in an associated video file, store the index file for a video file in a first memory location, separate from a second memory location in which the video file is stored, receive, from a requesting entity, a request for access to the index file, in response to the request, download the index file to the requesting entity, and download the video file to the requesting entity.

19 Claims, 4 Drawing Sheets

EXTENSIBLE USER INTERFACE FOR DIGITAL DISPLAY DEVICES

BACKGROUND

Digital display devices may be controlled by remote devices, typically by an infrared link. In some instances a digital display device such as a digital television may be coupled to multiple devices. In some circumstances it may be useful to permit integrated control of devices coupled to the display device.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Some of the embodiments discussed herein may provide techniques to implement an extensible user interface in digital display devices. Such techniques may enable a digital display device such as, e.g., a digital television, and one or more video source devices such as, e.g., a digital video disk (DVD) player, a personal computer, or a home storage server to integrate their respective user interfaces into a single user interface which may be managed by a single device.

Figure 1:
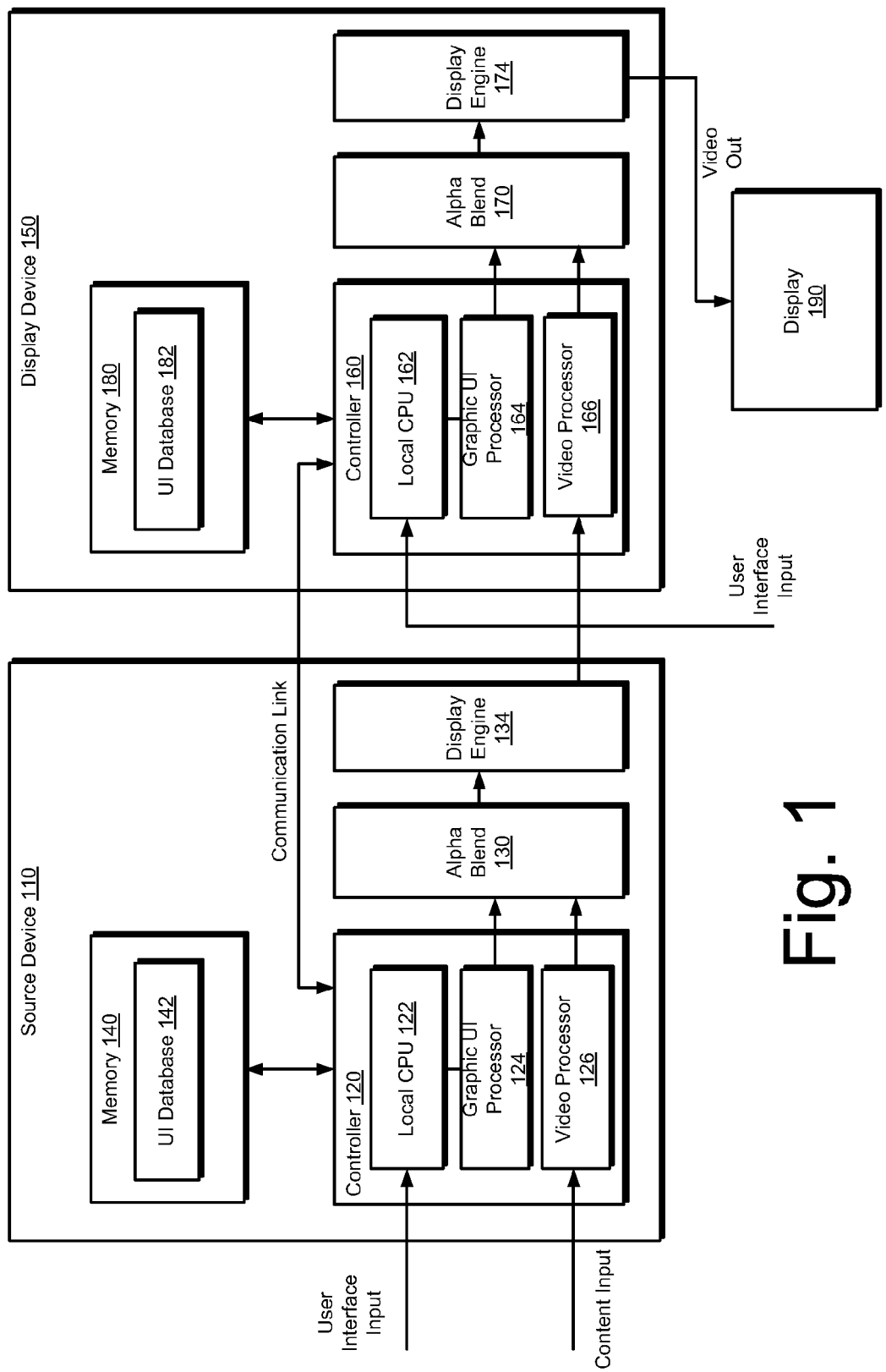
FIG. 1 is a schematic illustration of a digital display system architecture in accordance with some embodiments.

FIG. 1 is a schematic illustration of a digital display system architecture in accordance with some embodiments. Referring to FIG. 1, the architecture comprises at least one source device 110 coupled to a digital display device 150 by or more communication connections 140. In practice, a display device 150 may be coupled to multiple source devices such as, e.g., e.g., a digital video disk (DVD) player, a personal computer, or a home storage server, or the like by a communication connection such as, e.g., a High-Definition Multimedia Interface (HDMI) connection, an RF (coaxial cable) connection, a composite video connection, an S-video connection, a VGA connection, or the like.

In some embodiment, source device 110 comprises a controller 120 and a memory module 140. Controller 120 comprises a local CPU, or processor, 122, a graphical user interface (UI) processor 124, a video processor 126. The processor 122 may be a conventional computer processor, a configurable processor such as, for example, a field programmable gate array (FPGA), or a processor specifically designed for distribution system 110, for example, an application specific integrated circuit (ASIC). Similarly, graphical user interface processor 124 may be implemented as a separate controller (i.e., an application specific integrated circuit (ASIC) or a field programmable gate array (FPGA) or may be integrated into processor 122. Alternatively, graphical user interface processor 124 may be implemented as logic instructions which, when execute don a processor, provide the functionality of a graphical user interface. The video processor 126 may be implemented as an adjunct video/graphics processor, or may be integrated into processor 122.

Memory module 140 may comprise active memory such as, RAM, and may comprise one or more persistent storage media, for example one or more hard disk drives, optical drives, tape disk drives, or the like. In the embodiment depicted in FIG. 1, memory module 130 comprises a user interface database 142 which comprises screen settings and display parameters used by the graphical user interface processor 126 to implement a graphical user interface which may be used to control the source device 110.

Video source device 110 further comprises a mixer such as, e.g., an alpha blender module 130 which overlays output from graphical user interface processor 124 onto output from the video processor 126, such that a user interface may be displayed "on top of" a video screen. Output from the alpha blend module is input to a display engine, which in turn generates an output for display on a display module.

In some embodiments, display device 150 may be implemented as a digital television, a computer system, or other digital rendering system. In relevant part, display device comprises many components which are redundant in view of the components included in source device 110. For example, a digital display device 150 comprises a controller 160 and a memory module 180. Controller 160 comprises a local CPU, or processor, 162, a graphical user interface (UI) processor 164, a video processor 166. The processor 162 may be a conventional computer processor, a configurable processor such as, for example, a field programmable gate array (FPGA), or a processor specifically designed for display device 150, for example, an application specific integrated circuit (ASIC). Similarly, graphical user interface processor 164 may be implemented as a separate controller (i.e., an application specific integrated circuit (ASIC) or a field programmable gate array (FPGA) or may be integrated into processor 162. Alternatively, graphical user interface processor 164 may be implemented as logic instructions which, when executed on a processor, provide the functionality of a graphical user interface. The video processor 166 may be implemented as an adjunct video/graphics processor, or may be integrated into processor 162.

Memory module 180 may comprise active memory such as, RAM, and may comprise one or more persistent storage media, for example one or more hard disk drives, optical drives, tape disk drives, or the like. In the embodiment depicted in FIG. 1, memory module 180 comprises a user interface database 182 which comprises screen settings and display parameters used by the graphical user interface processor 166 to implement a graphical user interface which may be used to control the display device 150.

The graphical user interface processor 164 enables a user to generate input to control the display device 150, for example by a remote control device which establishes a communication link with the display device through an infrared (IR) interface, and electromagnetic interface, or the like. Input from the user interface is presented to the controller 160 through the local CPU 162, which is coupled to the graphical user interface processor 164. The graphical user interface processor 164 processes input from the user interface input and uses data from the user interface database 182 to enable a user to control the device 150 from screens presented on the display 190.

Display device 150 further comprises a mixer such as, e.g., an alpha blender module 170 which overlays output from graphical user interface processor 164 onto output from the video processor 166, such that a user interface may be displayed "on top of" a video screen. Output from the alpha blend module is input to a display engine, which in turn generates an output for display on a display module.

A display device 190 such as, e.g., a liquid crystal display (LCD) monitor, a plasma monitor, or a cathode ray tube (CRT) monitor is coupled to the display engine 174.

In operation, video content from the source device 110 is passed from the display engine 134 to the video processor 164 of the display device 150. The video content may comprise, for example, movies, television content, videos, and the like. In most cases the display engine 134 will output video that is fully prepared for presentation on a display such as display 190. In this circumstance, the video output from display engine 134 may bypass video processor 164, or video processor 164 may effectively act as a "pass through" component, which does not actively process the video content. However, in some embodiments video content output from the display engine 134 may require further processing, for example to format the video content in a format appropriate for the display 190. In this circumstance, the video processor 166 processes the video content output by the display engine 134.

In one embodiment, the controllers 120 and 160 are adapted to cooperate such that the user interface database 142 from the video source device 110 and the user interface database 182 of the display device 150 can be merged. Operation of both devices may then be accomplished via a single user interface.

Figure 2:
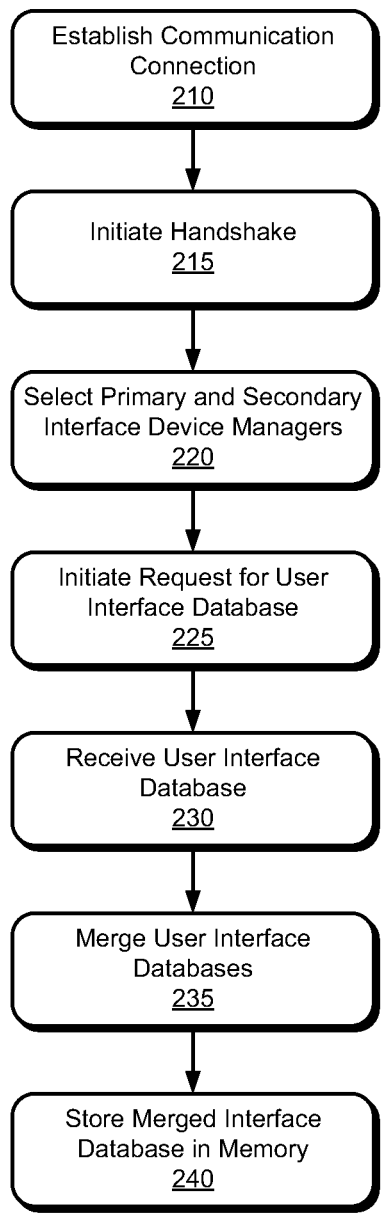
FIGS. 2-3 are flowcharts illustrating operations of methods to implement an extensible user interface for digital display devices, in accordance with some embodiments.
Figure 3:
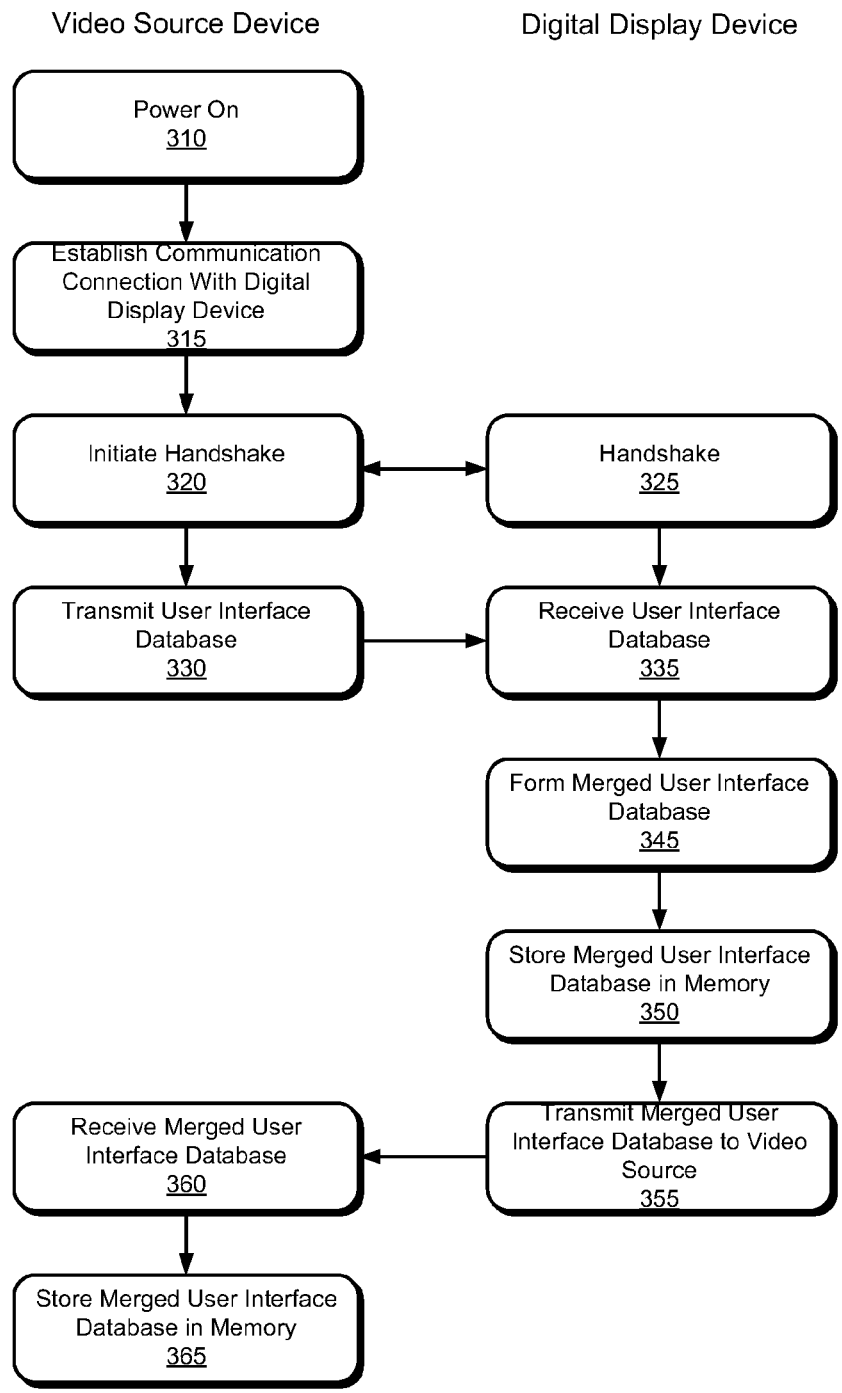

FIGS. 2-3 are flowcharts illustrating operations of methods to implement an extensible user interface for digital display devices, in accordance with some embodiments. In some embodiments, the operations depicted in FIG. 2 may be implemented by the controller 120 of source device, alone or in combination with the controller 160 of display device 150. Referring first to FIG. 2, at operation 210 a communication connection is established between the controllers 120 and the controller 160 (see FIG. 1). At operation 215 a handshake is initiated between the graphical user interface processor 126 in the source device 110 and the graphical user interface process 166 in the display device 150. In one embodiment, the graphical user interface processors 126, 166 exchange information describing their respective processing capabilities. For example, during the handshake process each graphical user interface processor may transmit at least one graphics processing capability parameter to the other graphical processor or processors.

At operation 220 one of the graphical user interface processors is designated as a primary interface device manager while another graphical user interface processor is designated as a secondary interface device manager. For example, in one embodiment the graphical user interface controllers compare the graphics processing capability parameters exchange during the handshake process, and the processor which has a higher graphics processing capability is selected as the primary graphics interface device manager.

At operation 225 the primary interface device manager initiates a request for a user interface database from the secondary interface device manager. For example, referring to FIG. 1, in an embodiment in which the graphical user interface processor 126 in the source device 110 is selected as the primary interface device manager, the graphical user interface processor 126 initiates a request to obtain the user interface database 182 from the display device 150. Conversely, if the graphical user interface 166 in the display device 150 is selected as the primary interface device manager, then the graphical user interface processor 166 launches an inquiry to request the user interface database 142 from the source device 110.

At operation 230 the primary interface device manager receives the user interface database requested at operation 225. At operation 235 the primary interface device manager merges the user interface database received at operation 230 with the local user interface database. In some embodiments, it may be useful to design each user interface database and a markup languages such as DHTML (Dynamic Hypertext Markup Language) and to format all graphics/bitmap assets in XML (eXtensible Markup Language) in both the source device 110 and the display device 150.

At operation 240 the primary interface device manager stores the merged interface database in a memory module. For example, referring to FIG. 1, in an embodiment in which the graphical user interface processor 126 in the source device 110 is selected as the primary interface device manager, the graphical user interface processor 126 saves the merged database in the memory 140 of source device 110. Conversely, if the graphical user interface 166 in the display device 150 is selected as the primary interface device manager, then the graphical user interface processor 166 saves the merged database in the memory 180 of the display device 150.

Once the merged database is saved in a memory location associated with the primary interface device manager both devices may be controlled using the user interface provided by the primary interface device manager. Again, referring to FIG. 1, in an embodiment in which the graphical user interface processor 126 in the source device 110 is selected as the primary interface device manager, the graphical user interface processor 126 may be used to control the source device 110 and the display device 150. Conversely, if the graphical user interface 166 in the display device 150 is selected as the primary interface device manager, then the graphical user interface processor 166 may be used to control the source device 110 and the display device 150.

In some embodiments, the primary interface device manager may transmit a signal, referred to herein as a user interface suppression mode signal, to the secondary interface device manager. Upon receiving the user interface suppression mode signal the secondary interface device manager disables the user interface processor in the secondary interface device. In addition, in response to the user interface suppression mode signal the secondary interface device manager may activate a user interface relay service. In operation, when a control signal is received in the secondary interface device manager requesting access to a service provided by the user interface of the secondary interface device, the user interface relay service passes the control signal to the user interface on the primary interface device.

In some embodiments, the primary interface device manager and the secondary interface device manager cooperate to enable the secondary interface device manager to serve as a backup user interface. For example, in some embodiments the primary interface device manager transmits the merged a user interface database to the secondary interface device manager and the secondary interface device manager stores the merged user interface database in a memory module. Then in the event that the primary interface device manager is powered off the primary interface device manager can assign user interface management responsibilities to the secondary interface device manager.

FIG. 3 is a flowchart illustrating additional operations in a method to implement an extensible user interface in a digital display device in accordance with some embodiments are presented. In some embodiments the operations in the left-hand column of FIG. 3 may be implemented by the controller 120 of the source device 110 and the operations in the right-hand column of FIG. 3 may be implemented by the controller 160 of display device 150.

Referring now to FIG. 3, at operation 310 the video source device is powered on. At operation 315 the video source device establishes a communication connection with the digital display device. For example in an embodiment in which the source device 110 is coupled to the display device by interface such as an HDM, DVI or VGA interface the video source device 110 may initiate a communication connection in accordance with the relevant protocol.

At operation 320 the video source device 110 initiates a handshake with the display device 150, which reciprocates at operation 325. As described with respect to operation 215, the video source device 110 and digital display device 150 may exchange various operational parameters during the handshake process including, for example, the graphics processing capability parameters.

At operation 330 the video source device 110 transmits the user interface database 142 to the digital display device 150 via the communication connection established in operation 315. At operation 335 the digital display device 150 receives the user interface database and at operation 345 the digital display device performs a merged user interface database comprising the user interface database 142 transmitted from source device 110.

At operation 350 the display device 150 stores the merged user interface database in memory 180. At operation 355 the display device 150 transmits the merged user interface database to the video source device 110, which receives the database at operation 360 and stores the merged user interface database in memory 140 at operation 365.

In some embodiments, the operations of FIG. 3 may be repeated each time a new video source device 110 is coupled to the display device 150, such that the display device user interface database 182 accumulates as a composite database comprising control information for each device coupled to the display device 150. This permits a user of the display device 150 to control any device coupled to the display device 150 using the user interface managed by the display device 150.

Figure 4:
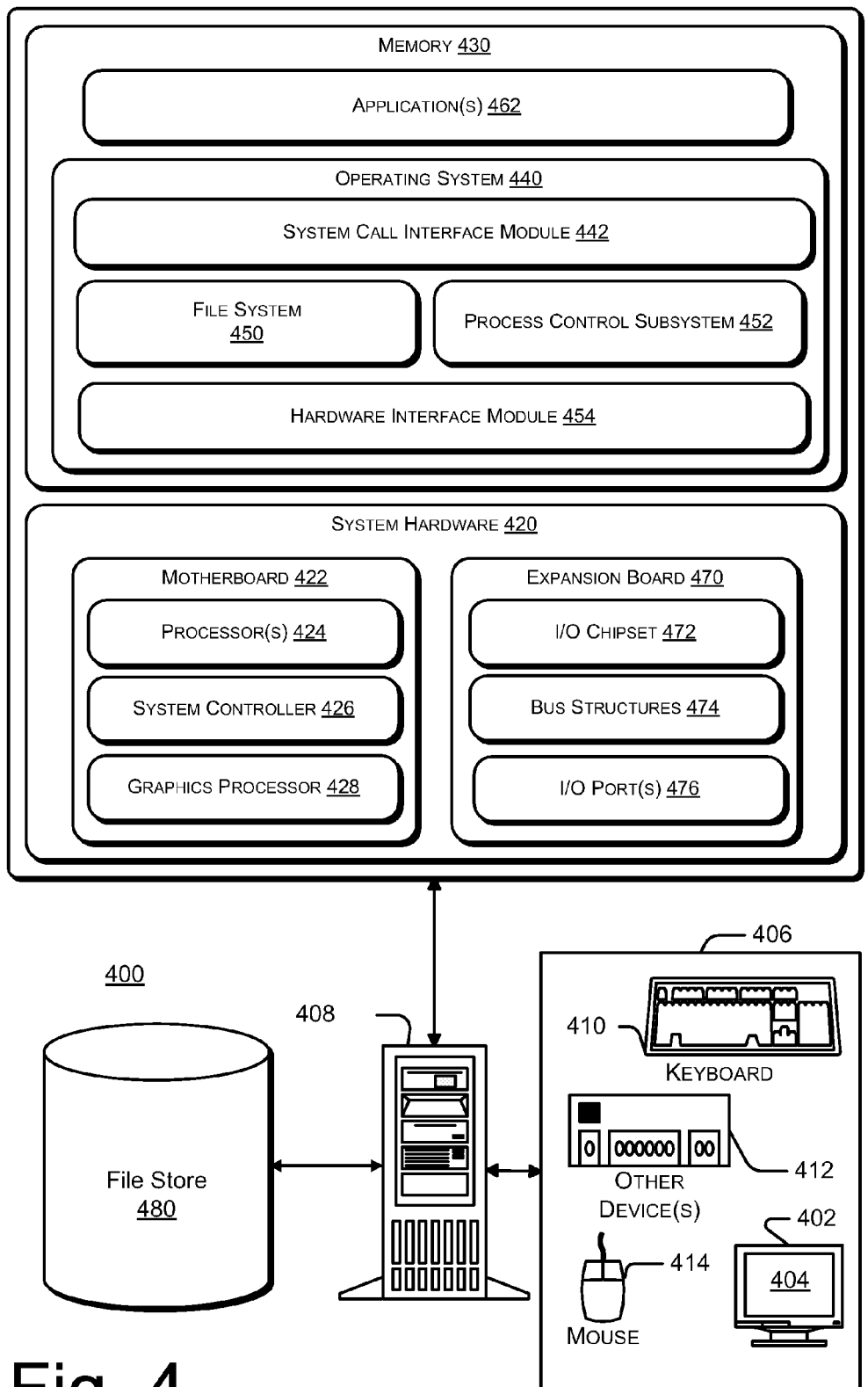
FIG. 4 is a schematic illustration of a computer system in accordance with some embodiments.

As described above, in some embodiments, one or more of the video source device 110 or the display device 150 may be implemented in a computer system. FIG. 4 is a schematic illustration of a computer system 400 which may be adapted to implement an extensible user interface as described herein. The computer system 400 may include a computer 408 and one or more accompanying input/output devices 406, e.g., a display 402 having a screen 404, a keyboard 410, and a mouse 414.

The computer 408 includes system hardware 420 including a processor 422 and random access memory and/or read-only memory 430. A file store 480 is communicatively connected to computer 408. File store 480 may be internal such as, e.g., one or more hard drives, or external such as, e.g., one or more external hard drives, network attached storage, or a separate storage network.

In some embodiments, system hardware 420 comprises a motherboard 422 and at least one expansion board 470. Motherboard 422 hosts a plurality of components comprising at least one processor 424, system controller 426, and a graphics processor. Motherboard 422 further comprises sockets to receive the various components mounted on motherboard 422 and circuit traces to provide electrical connections between the components.

In some embodiments, expansion board 470 may be an input/output (I/O) board. Expansion board 470 may include an I/O chipset such as, for example, a PCI-Express (PCIE) chipset 472, and bus structures 474 and one or more I/O ports 476. In some embodiments expansion board may include components which provide different functionality.

Memory 430 comprises an operating system 440 for managing operations of computer 408. Operating system 440 comprises a hardware interface module 454 that provides an interface to system hardware 420. At least one or more file systems 450 to manage files used in the operation of computer 408, and a process control subsystem 452 that manages processes executing on computer 408. Operating system 440 further comprises a system call interface module 442 that provides an interface between the operating system 440 and one or more applications executing on the computer system.

In operation, applications 462 executing on computer 408 make calls to the system call interface module 442 to execute one or more commands on the computer's processor. The system call interface module 442 invokes the services of the file systems 450 to manage the files required by the command(s) and the process control subsystem 452 to manage the process required by the command(s). The file system 450 and the process control subsystem 452, in turn, invoke the services of the hardware interface module 454 to interface with the system hardware 420.

Thus, described herein are exemplary systems and methods to implement an extensible user interface in a digital video system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disks, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method to manage a user interface in a digital display device, comprising:

establishing a communication connection between the digital display device and at least one video source device;

initiating a handshake process between the digital display device and the video source device;

selecting one of the digital display device or the video source device as the primary interface device manager and one of the digital display device or the video source device as the secondary interface device manager;

initiating, from the primary interface device manager, a request for a user interface database from the secondary interface device manager; and receiving in the primary interface device manager, a user interface database from the secondary interface device manager;

merging the user interface database from the secondary interface device manager with a user interface database from the primary interface device manager to form a merged user interface database; and storing the merged user interface database in a memory module coupled to the primary interface device manager.

2. The method of claim 1, wherein selecting one of the digital display device or the video source device as the primary interface device manager and one of the digital display device or the video source device as the secondary interface device manager comprises:

transmitting at least one graphics processing capability parameter associated with the video source device to the digital display device;

comparing the graphics processing at least one graphics processing capability parameter associated with the video source device with a corresponding graphics processing capability parameter associated with the digital display device; and assigning the primary interface device manager to a device associated with the higher graphics processing capability.

3. The method of claim 1, further comprising:

transmitting a user interface suppression mode signal from the primary interface device manager to the secondary interface device manager;

receiving, at the secondary interface device manager, the user interface suppression mode signal; and in response to the user interface suppression mode signal, disabling the user interface controller in the secondary interface device manager.

4. The method of claim 3, further comprising:

in response to the user interface suppression mode signal, activating a user interface relay service in the secondary interface device manager.

5. The method of claim 4, further comprising:

receiving, in the secondary interface device manager, a control signal requesting access to a user interface; and passing the control signal via the user interface relay service to the primary user interface device.

6. The method of claim 1, further comprising:

transmitting the merged user interface database from the primary interface device manager to the secondary interface device manager; and storing the merged user interface database in a memory module coupled to the secondary interface device manager.

7. The method of claim 6, further comprising:

receiving, in the primary interface device manager, a power off signal; and reassigning the secondary interface device manager as the primary interface device manager.

8. A system, comprising:

at least one video source device;

a digital display device comprising logic to;

establish a communication connection between the digital display device and at least one video source device;

initiate a handshake process between the digital display device and the video source device;

receive, a user interface database from the video source device;

merge the user interface database from the video source device with a user interface database from the digital display device to form a merged user interface database; and store the merged user interface database in a memory module coupled to the digital display device.

9. The system of claim 8, wherein the digital display device further comprises logic to transmit a user interface suppression mode signal from the digital display device to the video source device; and wherein the video source device comprises logic to:

receive the user interface suppression mode signal; and in response to the user interface suppression mode signal, disable the user interface controller in the video source device.

10. The system of claim 8, wherein the video source device further comprises logic to activate a user interface relay module in the video source device in response to the user interface suppression mode signal.

11. The system of claim 10, wherein the video source device further comprises logic to:

receive a control signal requesting access to a user interface; and pass the control signal via the user interface relay module to the video display device.

12. The system of claim 8, wherein the digital display device further comprises logic to:

transmit the merged user interface database from the digital display device to the video source device; and store the merged user interface database in a memory module coupled to the video source device.

13. The system of claim 12, wherein the digital display device further comprises logic to:

receive a power off signal; and reassign the secondary interface device manager as the primary interface device manager.

14. A system, comprising:

a digital display device; and at least one video source device comprising logic to;

establish a communication connection between the digital display device and at least one video source device;

initiate a handshake process between the digital display device and the video source device;

receive, a user interface database from the digital display device;

merge the user interface database from the digital display device with a user interface database from the video source device to form a merged user interface database; and store the merged user interface database in a memory module coupled to the video source device.

15. The system of claim 14, wherein the video source device further comprises logic to transmit a user interface suppression mode signal from the video source device to the digital display device; and wherein the digital display device comprises logic to:

receive the user interface suppression mode signal; and in response to the user interface suppression mode signal, disable the user interface controller in the digital display device.

16. The system of claim 15, wherein the digital display device further comprises logic to activate a user interface relay module in the video source device in response to the user interface suppression mode signal.

17. The system of claim 16, wherein the digital display device further comprises logic to:

receive a control signal requesting access to a user interface; and pass the control signal via the user interface relay module to the video display device.

18. The system of claim 14, wherein the video source device further comprises logic to:

transmit the merged user interface database from the video source device to the digital display device; and store the merged user interface database in a memory module coupled to the secondary interface device manager.

19. The system of claim 18, wherein the video source device further comprises logic to:

receive a power off signal; and reassign the digital display device as the primary interface device manager.

* * * * *